Jan. 19, 1932.　　　R. M. NICHOLS　　　1,841,977
ELECTRICAL PROSPECTING
Original Filed Jan. 16, 1929
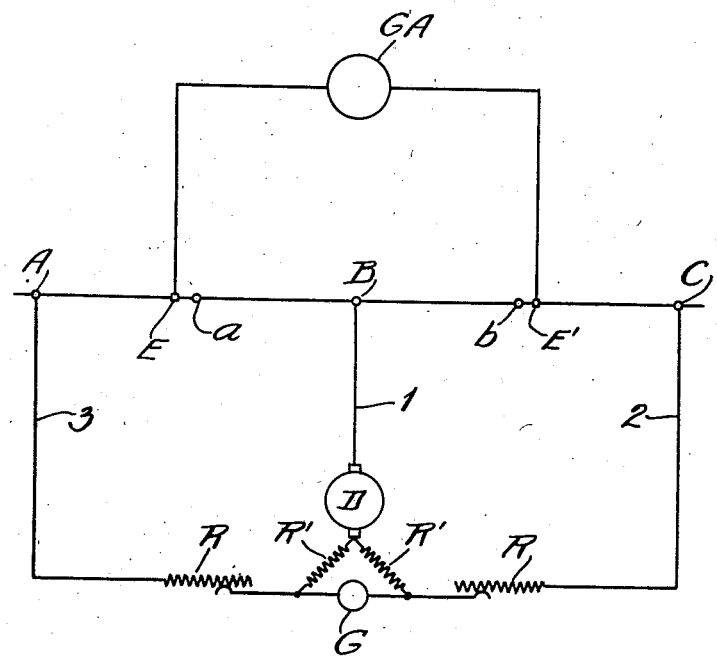
INVENTOR
RALPH M. NICHOLS
BY John E. Hubbell
ATTORNEY Patented Jan. 19, 1932

1,841,977

UNITED STATES PATENT OFFICE

RALPH M. NICHOLS, OF DALLAS, TEXAS, ASSIGNOR OF ONE-HALF TO CHARLES R. NICHOLS AND ONE-HALF TO SAMUEL H. WILLISTON, BOTH OF DALLAS, TEXAS

ELECTRICAL PROSPECTING

Application filed January 16, 1929, Serial No. 332,781. Renewed November 12, 1931.

The present invention relates to the method of determining the location and character of subsurface bodies or earth portions of different electrical resistance from the adjacent earth portions, by creating an electric current flow through the earth and measuring electrical effects produced at the surface of the earth resulting by such current flow to thereby determine the modifying influence, if any, on the distribution of current flow through the earth of such bodies or earth portions.

The general object of the present invention is to provide an improvement in the above described method characterized by the simplicity of the apparatus and operations required, and by the rapidity with which such operations may be carried out.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described preferred embodiments of the invention.

In the accompanying drawing and descriptive matter the one figure of the drawing is a diagram illustrating a preferred mode of practicing the present invention.

In the drawing, A, B and C represent energization points on an exploration line at the surface of the earth, and D is a direct current dynamo or other suitable source of current for causing a current flow through the earth between the energization points A and B, and a current flow through the earth between energization points B and C. One terminal of the current source D is connected to the point B by a conductor or circuit branch 1, and the other terminal of the source is connected by conductors or circuit branches 2 and 3 to the points A and C.

For the purpose of the present invention it is necessary that the strength of the currents in the circuit branches 2 and 3 should be definitely related, and in practice, it is ordinarily preferable that the two currents should be of equal strength. For the purpose of regulating the relative current strengths in the branches 2 and 3 a regulable resistance R is provided in each of said branches. To facilitate the relative adjustment of the resistances R required, a second resistance R' is also provided in each of the circuit branches 2 and 3, and a galvanometer G has its terminals connected to terminals of the resistance R' as shown, so that the galvanometer will give no deflection when the same potential drop is produced in each of the resistances R'. If the resistance values of the two resistances R' are the same, the galvanometer G will thus give no deflection when the currents flowing through the two circuit branches 2 and 3 are of equal strength.

To detect the existence or non-existence of disturbances in the distribution of the currents caused to flow through the earth between the energization points A and B, and C and D, I advantageously employ a detector circuit comprising a galvanometer GA and exploring electrodes E and E' connected one to one, and the other to the second of the terminals of the galvanometer GA. Each of the electrodes E and E' is movable over the surface of the earth, and in use the galvanometer GA gives, or does not give, a deflection accordingly as the portions of the earth's surface with which the exploring electrodes E and E' are respectively in contact, are at different potentials, or are at the same potential.

Both at the points of energization A, B and C, and at the points at which the exploring electrodes E and E' are in contact with the earth, known expedients may be employed to avoid polarization troubles and to minimize earth contact resistance. For example, the earth at each exploring electrode location and at each energization point may be impregnated with a salt solution of the metal forming the electrode or contact part in contact with the earth, and at each energization point contact with the earth is ordinarily effected by the use of a multiplicity of metal stakes connected to the corresponding circuit branches 1, 2 or 3, and driven into the earth at points distributed over a considerable surface area such as that lying within a circle 50 feet or so in diameter. When contact with the earth at points A, B and C is effected in this manner, no significant practical error is made in assuming each energization point to be the center point of the area in which the contact stakes are driven, especially since the dimensions of that area are relatively very small as compared with the distance between any two energization areas.

In ordinary practice, the point B is located midway between the points A and C, and at a distance from each of the latter which may vary from a few hundred feet in some cases, up to fifteen thousand or more feet in other cases.

In accordance with the present invention, the detector circuit is employed to determine relative potential conditions along the lines A—B, and B—C, and thereby determine whether bodies of oil sands or other earth portions of different resistance from the adjacent earth are so located as to significantly affect the distribution of current flow through the earth between the different energization points, and thereby create a potential difference between some point on the line A—B and a symmetrically placed point on the line B—C, between which points no potential difference would exist if all portions of the earth in significant proximity to the exploration field were of uniform resistance. With equal current flows produced by the source D through the earth between the points A and B, and between the points B and C, the difference between the potential of the earth surface at a point $a$ midway between the points A and B, and the potential of the earth's surface at a point $b$ midway between the points B and C will not be varied by interrupting or reversing the current flows between the energization points produced by the current source D, provided all portions of the earth within significant distance of the energization field are of uniform resistance. On the other hand, the presence of a body of oil sand or other earth portion differing in conductivity from the adjacent earth, of such magnitude and so located as to exert an effect on the distribution of current flow between points A and B significantly different from that exerted by it on the distribution of current flow between the points B and C, will result in a potential relation of the points $a$ and $b$ which will be varied when the current flow between the energization points is interrupted or established.

Theoretically, of course, the entire earth forms the conductor through which current flows between the points A and B, and between the points B and C, and every body or earth portion of different resistance from the surrounding earth, and closer to the points A and B than to the points B and C tends to unequally affect the potentials at the points $a$ and $b$. It is mathematically demonstrable and has been experimentally established, however, that the potentials at the points $a$ and $b$ are not materially affected by earth bodies or portions of conductivity markedly different from that of the adjacent earth, unless such bodies or earth portions are closer to the energization points than a distance similar in magnitude to, and not more than two or three times greater than the distance between the points A and C. Disturbing bodies located at a greater distance create potential variations between the points $a$ and $b$ within, or comparable with, the ordinary range of observational error in the use of the apparatus shown in the drawing.

In the preferred practical procedure employed in the use of the invention herein disclosed, the exploring electrodes E and E' are placed upon the points $a$ and $b$, and a reading of the galvanometer GA is made when no current flow between the energization points A and B, and B and C, is being produced by the current source D. Any potential difference between the points $a$ and $b$ then existing as a result of stray earth currents, may be compensated or allowed for in the subsequent observations. The source D is then employed to create a suitable current flow into or out of the earth at the points A, B and C. If resistance conditions in the portion of the earth within significant proximity to the line A—B, are the same as in the portion of the earth in significant proximity to the line B—C, the flow of current produced by the source D will not change the difference between the potentials at the points $a$ and $b$. A body of ore or oil sand of different resistance from the adjacent earth, underlying the line $b$—C, and not under any portion of the line A—$b$, will result in a deflection of the galvanometer GA in one direction or the other accordingly as said body is of higher resistance or lower resistance than the adjacent earth.

In either event, by moving the electrode E' along the line B—C in the proper direction and for the proper distance, the electrode E' may be brought into contact with a portion of the earth's surface at which the potential bears the same relation to the potential at the point $a$ as existed between the potentials at the points $a$ and $b$ when there was no current flow due to the source D. After noting the direction and extent of displacement of the exploring electrode E' from the point $b$ necessary to restore the relation between the potentials of the electrodes E and E' existing when the source D is creating no current flow, the exploring electrode E' is returned to the point $b$, and the displacement of the electrode E along the line A—B necessary to eliminate any potential difference between the electrodes E and E' is noted.

With any single setting or location of the energization points A, B and C, energized as described, similar changes in the absolute potentials at the points *a* and *b* are produced by symmetrical resistance variations under the lines A—B and B—C when the current flow from the source D is established and interrupted and hence such resistance variations do not affect the deflections of the galvanometer GA. For example, with the earth resistance under the line A—*a*, uniform and like that under the line *b*—C, and similarly unlike that under all portions of the line *a*—*b*, the creation and interruption of the earth current flow produced by the source D will not result in deflections of the galvanometer GA. However, successive observations with the energization points A, B and C successively displaced along the line A—B—C or rather an extension thereof, will collectively indicate the existence, and give significant information concerning the character and location of the bodies of oil sand or ore underlying the line of exploration at a depth not too great to be within the range of effective observation. With the use of the invention it is thus possible to detect bodies of oil sand at a depth of several thousand feet below the earth's surface. The method disclosed herein is characterized by obvious simplicity of the apparatus and operative steps required for its use, and for that reason is adapted for advantageous use in some cases in rapid preliminary exploration or reconnaissance work, to be supplemented, when its use indicates the existence of earth portions having the resistance characteristics sought for, by the more precise methods of electrical exploration disclosed and claimed in the application of Charles R. Nichols and Samuel H. Williston, Serial No. 303,542, filed September 1, 1928.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent is:—

1. The method of electrical prospecting which consists in creating a current flow through the earth between one energization point and each of two other energization points, and comparing the potential at a point on the earth's surface between the first mentioned energization point and one of the other energization points with the potential at a point on the earth's surface between the first mentioned energization point and the third energization point.

2. In electrical prospecting the method of field energization which consists in creating a current flow through the earth between one energization point and a second energization point and a second current flow, definitely related in strength to the first current flow, between the first mentioned point and a third energization point.

3. The method of electrical prospecting which consists in creating a similar potential difference between a point on the earth's surface, and each of two other points on the earth's surface at opposite sides of the first mentioned point, and locating a point on the earth's surface between the first mentioned point and one of said two other points at which the potential is the same as that at a point midway between the first mentioned point and the second of said two other points.

RALPH M. NICHOLS.